Oct. 18, 1938.                I. B. DENTON                2,133,539
                        CONVERTIBLE VEHICLE SEAT
                        Filed June 1, 1937           2 Sheets-Sheet 2
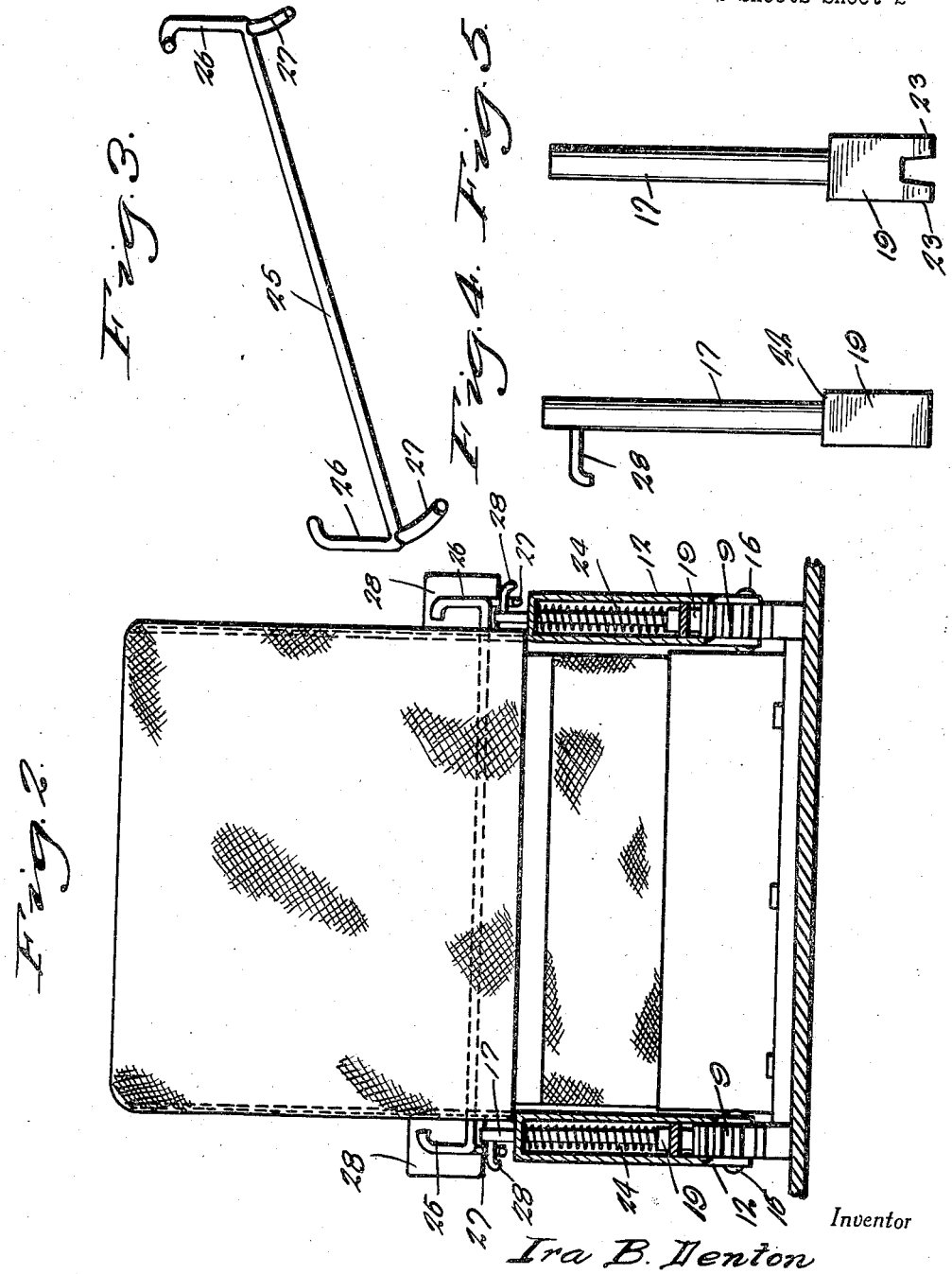
Inventor
*Ira B. Denton*
By *Clarence A. O'Brien*
   *Hyman Berman*
                                    Attorneys Patented Oct. 18, 1938

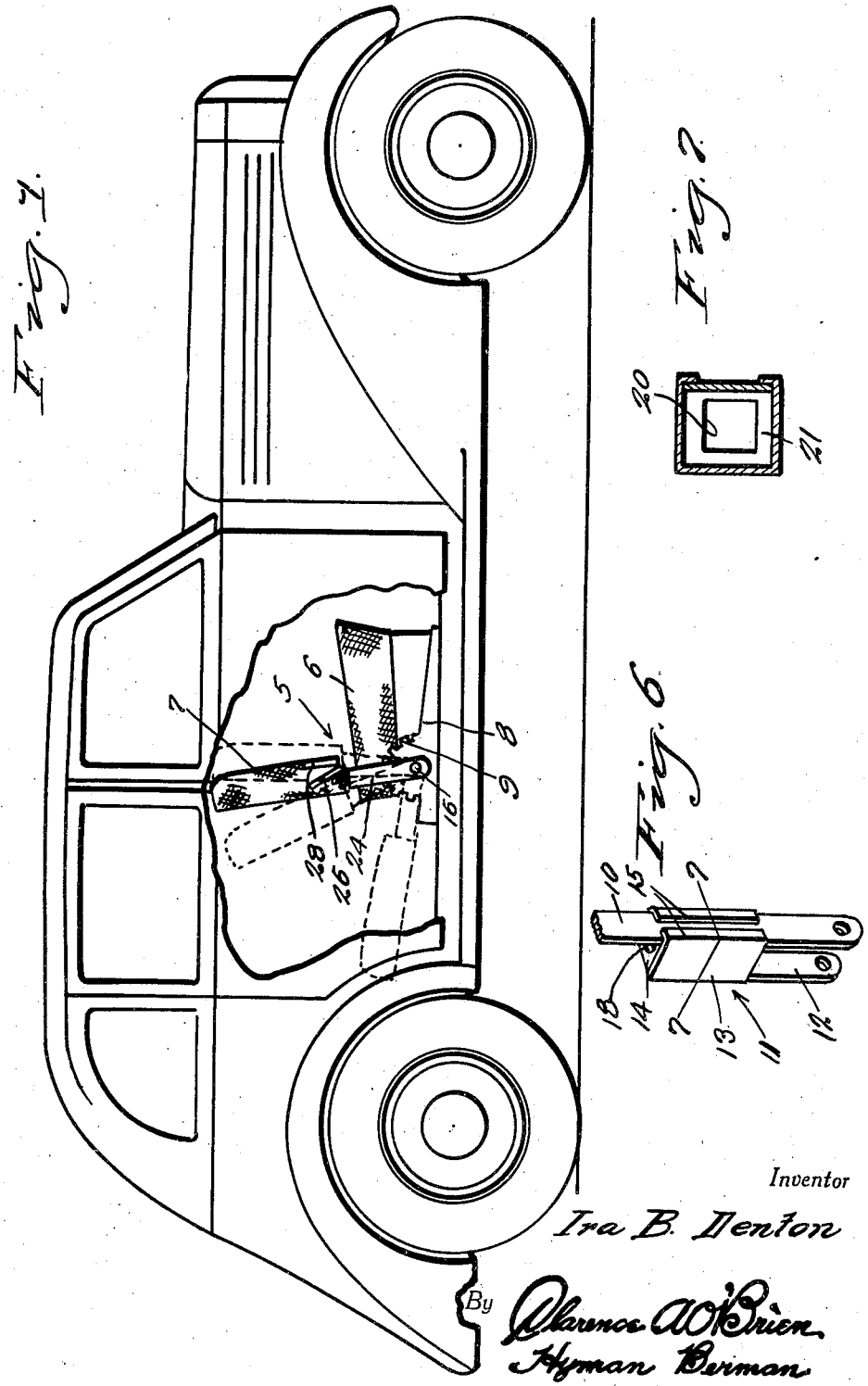

2,133,539

UNITED STATES PATENT OFFICE 2,133,539

CONVERTIBLE VEHICLE SEAT

Ira B. Denton, Mosca, Colo.

Application June 1, 1937, Serial No. 145,879

2 Claims. (Cl. 155—7)

This invention relates to convertible vehicle seats, and an object of the invention is to provide improved means for supporting the back of the front seat of the automobile, whereby said back may be swung from a substantially vertical position to a horizontal position to provide in conjunction with the stationary sections of the front and rear seats of the automobile, a bed within the vehicle.

The invention, together with its objects and advantages, will be best understood from a study of the following description, taken in connection with the accompanying drawings, wherein:

Figure 1 is a side elevational view of a conventional vehicle illustrating the application of my invention.

Figure 2 is a rear elevational view of the front seat of an automobile embodying the features of the present invention.

Figure 3 is a perspective view of a latch rod.

Figure 4 is an elevational view of a detent rod.

Figure 5 is an elevational view of the detent rod taken at right angles to Figure 4.

Figure 6 is a fragmentary perspective view of a yoke assembly hereinafter more fully referred to.

Figure 7 is a sectional view taken substantially on the line 7—7 of Figure 6.

Referring to the drawings by reference numerals, it will be seen that the numerals 5 indicate generally the front seat of an automobile. In accordance with the present invention, the seat 5 is provided with the stationary seat section 6 and the vertically swingable backrest section 7. Seat section 6 and backrest section 7 are suitably upholstered and in general construction are conventional to the construction of vehicle seats.

However, in accordance with the present invention, there are suitably mounted on the floor of the vehicle on opposite sides of the seat section 6 rails or cleats 8 which at their rear ends are provided with rack segments 9.

Also at each side thereof there is incorporated in the back rest section 7 an assembly 11 which includes an elongated flat bar 10 which has one end thereof complemental to a short flat bar 12 as shown in Figure 6.

Adjacent the upper portion thereof the bar 12 is provided with said flanges 13, and at its upper end with an inwardly directed top flange 14 forming with the flanges 13 a substantially rectangular boxing as shown in Figure 7. One side of the boxing is formed by inturned flange extensions 15 provided at the vertical free edges of the side flanges 13, and these flanges 13 accommodate therebetween the lower portion of the bar 10 as shown in Figures 6 and 7.

At the lower ends thereof, bars 10 and 12 are pivoted as at 16 to a cleat 8 in a manner to accommodate the rack segment 9 therebetween.

Also associated with each assembly 11 is a locking dog or detent which includes, as shown in Figures 4 and 5, a rod 17 that works through the boxing 11 and through an opening 18 in the top 14 of the box. At its lower end the rod 17 is provided with a substantially rectangular head 19 that works through a rectangular opening 20 provided in a plate 21 adjacent the lower end of the boxing. The head 19 is enlarged to provide a shoulder 22 and is also bifurcated to provide a pair of teeth 23—23 cooperable with the teeth of the rack segment 9 for securing the seat 7 at the desired position of adjustment. The boxing serves as a housing for a coiled spring 24 one end of which bears against the top 14 of the boxing, and the other end of which bears against the shoulder 22 of the locking dog or detent for urging the teeth 23 of said dog into engagement with the teeth of the rack segment 9.

Suitably journalled in the lower portion of the backrest 7 is a latch rod 25 provided at its ends with integral handles 26 and latch fingers 27.

On the upper ends thereof the spring pressed detents or dogs 17 are provided with laterally extending hooks 28 arranged in the path of the fingers 27 so that by rotating the shaft 25 in one direction the heads of the detents 27 will be raised upwardly and out of engagement with the rack segments 9 to permit swinging of the backrest 7 to the desired position of adjustment.

It will thus be seen that the backrest 7 is supported so as to swing to any one of the several positions of adjustment suggested by broken lines in Figure 1, and that when desired, said rest 7 may be swung to a substantially horizontal position so as to provide in conjunction with the seat portion 6 of the seat 5 and the back seat of the automobile a couch or bed within the vehicle.

To protect the clothing, arms, or any part of the occupant of the seat 5 from coming into contact with the handles 26 or the latch fingers 27 of rod 25, there are provided at opposite side edges of the rests 7 laterally extending shields 28 as clearly shown in Figures 1 and 2.

It is thought that a clear understanding of the construction, utility and advantages of an invention of this character will be had without a more detailed description.

Having thus described the invention, what is claimed as new is:

1. In a seat, a stationary seat section, a backrest, means pivotally supporting said backrest, whereby said rest may be swung to different positions of adjustment relative to said stationary seat, the supporting means for said backrest including fixed rack segments mounted at opposite sides of the stationary seat section, yoke-like assemblies having shank portions secured to the backrest at opposite side edges of said backrest, and also having leg portions straddling said rack segments and pivoted to said segments, and spring pressed dogs slidably mounted on said yokes and engageable with said rack segments for securing the backrest at the desired position of adjustment, a latch rod rotatably mounted on said backrest adjacent the lower edge of the latter and having ends extending beyond the side edges of said backrest, said latch rod at each end thereof being provided with an integral handle and an integral latch finger, and each of said spring-pressed detents having a hook extending laterally therefrom and arranged in the path of a latch finger whereby upon rotative movement of said latch rod in one direction, said dogs will be moved out of engagement with said rack segments whereby said backrest is free to swing to a desired position of adjustment.

2. In a seat, a stationary seat section, a backrest, means pivotally supporting said backrest, whereby said rest may be swung to different positions of adjustment relative to said stationary seat, the supporting means for said backrest including fixed rack segments mounted at opposite sides of the stationary seat section, yoke-like assemblies having shank portions secured to the backrest at opposite side edges of said backrest, and also having leg portions straddling said rack segments and pivoted to said segments, and spring pressed dogs slidably mounted on said yokes and engageable with said rack segments for securing the backrest at the desired position of adjustment, a latch rod rotatably mounted on said backrest adjacent the lower edge of the latter and having ends extending beyond the side edges of said backrest, said latch rod at each end thereof being provided with an integral handle and an integral latch finger, and each of said spring-pressed detents having a hook extending laterally therefrom and arranged in the path of a latch finger whereby upon rotative movement of said latch rod in one direction, said dogs will be moved out of engagement with said rack segments whereby said backrest is free to swing to a desired position of adjustment, and shields projecting laterally from the side edges of said backrest in the region of the handle equipped ends of said latch rod as and for the purpose specified.

IRA B. DENTON.